United States Patent [19]

Lee et al.

[11] Patent Number: 5,699,848

[45] Date of Patent: Dec. 23, 1997

[54] METHOD FOR MANUFACTURING A REPLICA STAMPER

[75] Inventors: Chang-Yong Lee, Chunan-si; Joo-Hwan Kim, Seoul; Soo-Sun Ryu, Choongchungnam-do, all of Rep. of Korea

[73] Assignee: SKC Limited, Kyungki-do, Rep. of Korea

[21] Appl. No.: 560,695

[22] Filed: Nov. 20, 1995

[30] Foreign Application Priority Data

Dec. 3, 1994 [KR] Rep. of Korea .................. 94-32690

[51] Int. Cl.⁶ .................................................. B22D 23/00
[52] U.S. Cl. .................................................. 164/46; 164/19
[58] Field of Search ................................... 164/46, 6, 19, 164/35

[56] References Cited

U.S. PATENT DOCUMENTS 5,108,668 4/1992 Kallup ................................... 164/46

FOREIGN PATENT DOCUMENTS 2-50995 2/1990 Japan .

*Primary Examiner*—Joseph J. Hail, III
*Assistant Examiner*—I. H. Lin
*Attorney, Agent, or Firm*—Anderson Kill & Olick, P.C.

[57] ABSTRACT

A method for forming a replica stamper for use in mass producing an optical disk, wherein the optical disk has a plurality of tracks arranged spirally or concentrically, and each of the tracks includes a recess and a protrusion for recording information signals thereon, comprises the steps of: (a) preparing a master stamper having a top surface and a flat bottom surface, wherein the top surface of the master stamper includes a plurality of tracks corresponding to the plurality of tracks of the optical disk; (b) depositing a buffer layer on the top surface of the master stamper; (c) forming a replica stamper on top of the buffer layer; (d) disengaging the master stamper from the buffer layer and the replica stamper; and (e) removing the buffer layer from the replica stamper.

8 Claims, 4 Drawing Sheets

METHOD FOR MANUFACTURING A REPLICA STAMPER

FIELD OF THE INVENTION

The present invention relates to a method for manufacturing an optical disk; and, more particularly, to a method for forming a replica stamper for use in manufacturing an optical disk.

DESCRIPTION OF THE PRIOR ART

In FIGS. 1A to 1F, there are provided schematic cross sectional views illustrating a prior art method for manufacturing a stamper for use in producing an optical disk. As is well known, the process for manufacturing a stamper may begin with the preparation of a substrate 10, as shown in FIG. 1A, preferably made of a glass resistant to chemical attacks. The substrate 10 has a top and a bottom surfaces, 12, 14 that are flat and parallel to each other. A first separation layer 20, made of a photoresist, a water soluble polymer or an ionic compound is formed on the top surface 12 of the substrate 10 using a spin coating method.

In a subsequent step, the first separation layer 20 is patterned into a predetermined configuration using a laser beam recorder method to thereby form a patterned separation layer 30, as illustrated in FIG. 1B. The patterned separation layer 30 includes a plurality of recesses 40 and protrusions 42. Thereafter, a second separation layer 50, usually made of gold(Au) or silver(Ag) and having a thickness of 500 to 1500 Å, is uniformly formed on top of the patterned separation layer 30 by using such a technique as sputtering, as depicted in FIG. 1C.

In a next step, a metallic layer 60, made of a light metal, e.g., nickel(Ni) and having a thickness of 200 to 500 µm, is formed on the second separation layer 50 by using such a technique as non-electrolytic plating method, as depicted in FIG. 1D. The metallic layer 60 serves as the stamper for manufacturing an optical disk.

Subsequently, the patterned separation layer 30 and the substrate 10 are separated from the second separation layer 50 and the metallic layer 60, as shown in FIG. 1E.

Thereafter, the second separation layer 50 is removed from the metallic layer 60, as shown in FIG. 1F, thereby leaving the stamper for use in the fabrication of an optical disk.

The above-described stamper fabrication steps, as illustrated in FIGS. 1A to 1F, involve a laser beam recording process, including the steps for forming the first separation layer, patterning the first separation layer into a predetermined configuration and eventually disengaging thereof. These complicated processes, therefore, tend to make it difficult to obtain the desired reproducibility, reliability and yield.

SUMMARY OF THE INVENTION

It is, therefore, an object of the present invention to provide a method for forming a replica stamper which is simple and is applicable in the mass production of an optical disk.

It is another object of the present invention to provide a method for forming a replica stamper capable of providing an improved reproducibility, reliability and yield.

In accordance with the present invention, there is provided a method for manufacturing a replica stamper for use in the mass production of an optical disk, wherein the optical disk has a plurality of tracks arranged spirally or concentrically, and each of the tracks has a recess and a protrusion for the recordation of information signals thereon, the method comprising the steps of: (a) preparing a master stamper having a top surface and a flat bottom surface, wherein the top surface of the master stamper includes a plurality of tracks, the plurality of tracks on the master stamper corresponding to the plurality of tracks on the optical disk, each of the tracks being provided with a recess and a protrusion; (b) depositing a buffer layer on the entirety of the top surface of the master stamper; (c) forming a replica stamper on top of the buffer layer; (d) disengaging the master stamper from the buffer layer and the replica stamper; and (e) removing the buffer layer from top of the replica stamper.

BRIEF DESCRIPTION OF THE DRAWINGS

The above and other objects and features of the present invention will become apparent from the following description of preferred embodiments given in conjunction with the accompanying drawings, wherein.

DETAILED DESCRIPTION OF THE PREFERRED EMBODIMENTS

Figure 1A:
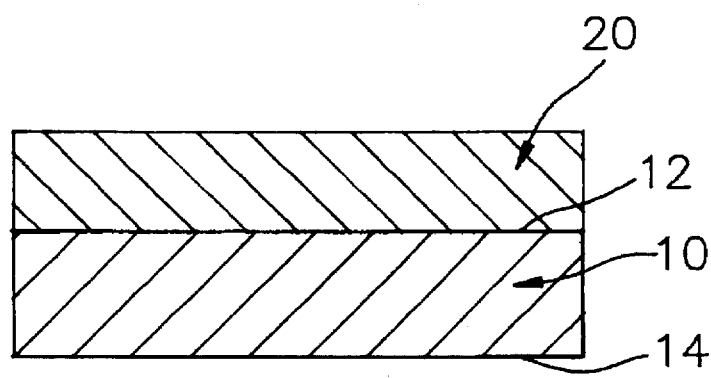
FIGS. 1A to 1F represent schematic cross sectional views of the manufacturing steps of a prior art method used in manufacturing a stamper.
Figure 1B:
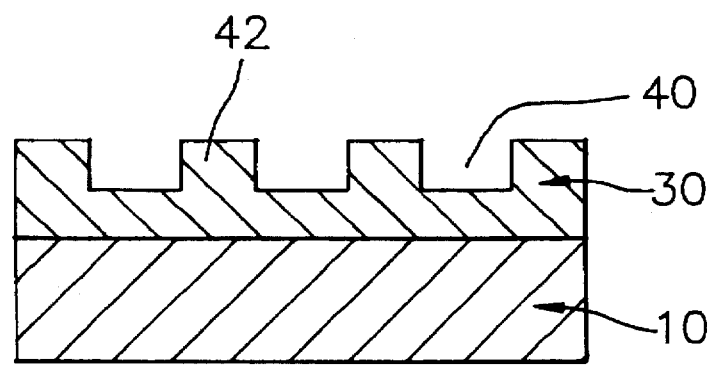
Figure 1C:
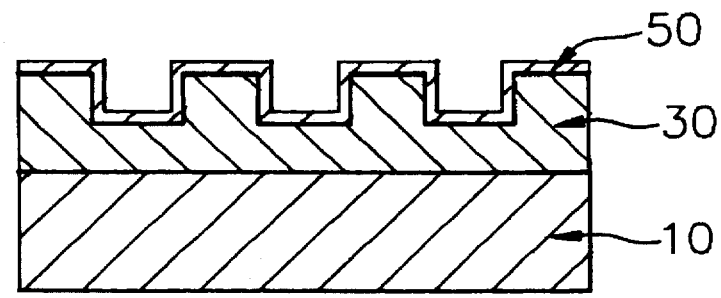
Figure 1D:
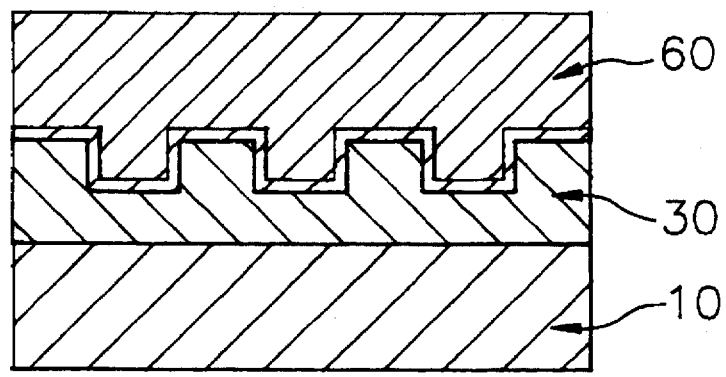
Figure 1E:
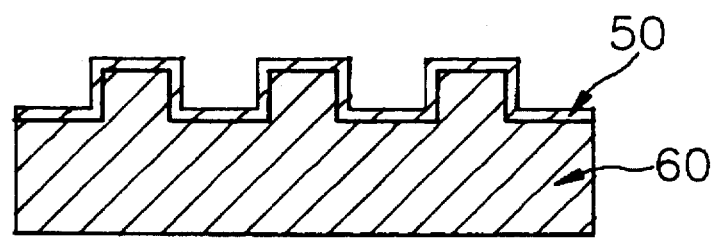
Figure 1F:
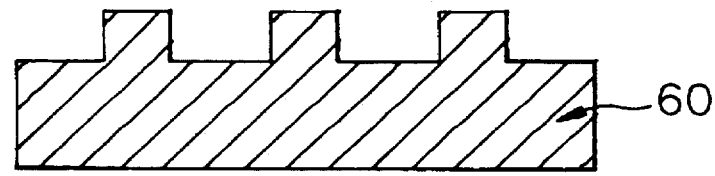
Figure 2A:
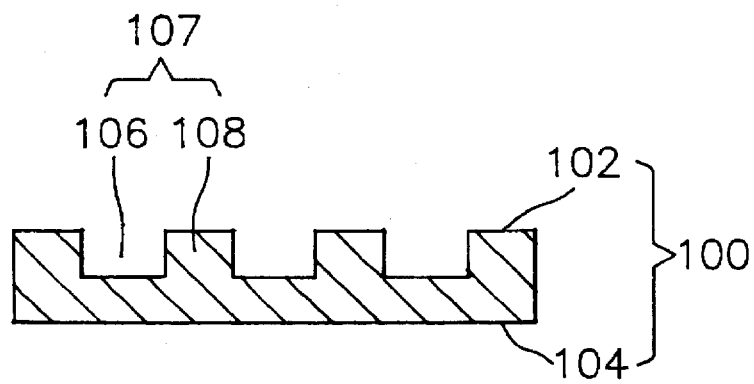
FIGS. 2A to 2E depict cross sectional views of the manufacturing steps of an inventive method in manufacturing a replica stamper.

Referring to FIGS. 2A to 2E, there are shown schematic cross sectional views of the manufacturing steps of the inventive method in manufacturing a replica stamper. The novel process for manufacturing the replica stamper begins with the preparation of a master stamper 100, as shown in FIG. 2A, made of nickel(Ni), chromium(Cr) or polycarbonate(PC) and having a top and a bottom surfaces, 102, 104, wherein the top surface 102 has a plurality of tracks 107, the tracks being arranged spirally or concentrically and the bottom surface 104 is flat. The master stamper 100 may be one of the stampers manufactured by using a prior art method such as the one described above. Each of the tracks 107 includes a fine recess 106 and a protrusion 108. It should be noted that the fine recess and protrusion correspond to those of an optical disk, respectively.

Figure 2B:
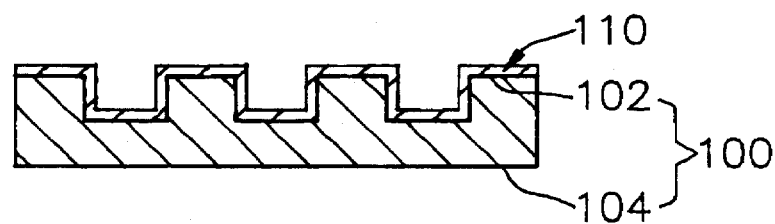

As shown in FIG. 2B, a buffer layer 110, made of a metal, e.g., silver(Ag) or gold(Au), and having a uniform thickness of 500–1500 Å, is formed on the top surface 102 of the master stamper 100 by using a sputtering method.

Figure 2C:
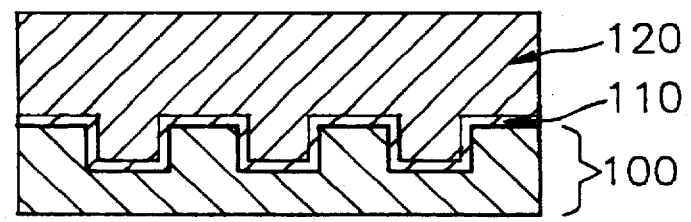

As depicted in FIG. 2C, a replica stamper 120, made of a nickel, e.g., Ni or Cr, is formed by covering the entire surface of the buffer layer 110 using a non-electrolytic plating method. The thickness of the replica stamper 120 is within a range from 200 to 500 µm.

Figure 2D:
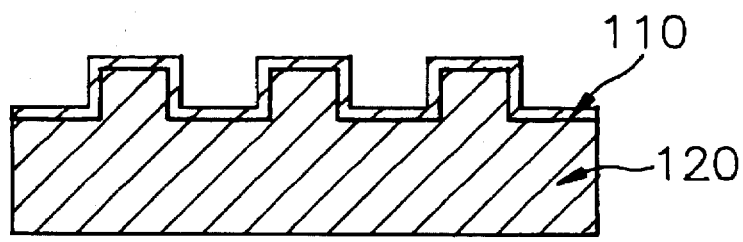
Figure 2E:
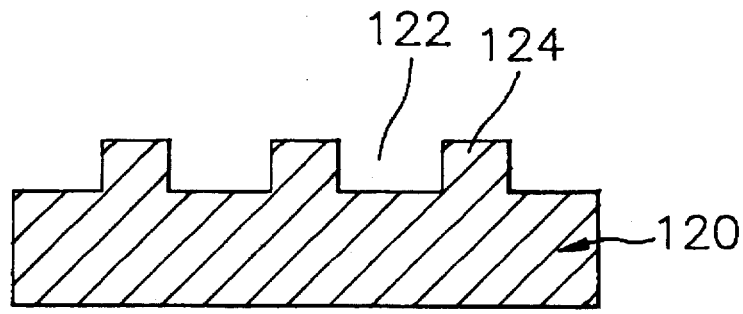

Referring to FIG. 2D, the replica stamper 120 and the buffer layer 110 on top thereof are separated from the master stamper 100. Subsequently, the buffer layer 110 is also removed from the replica stamper 120. The replica stamper 120 thus formed includes a plurality of recesses 122 and a corresponding number of protrusions 124, wherein the plurality of recesses 122 and the corresponding number of protrusions 124 on the replica stamper 120 are in conformity with the plurality of protrusions 108 and recesses 106 of the master stamper 100, respectively.

Additional replica stampers can be formed from the master stamper 100 by repeating the above-described fabrication process.

In comparison with the prior art method for manufacturing the stamper, the inventive method for manufacturing the replica stamper dispenses with a number of difficult manufacturing steps such as the laser beam recorder process, thereby simplifying the overall stamper manufacturing procedure, thereby improving the reproducibility and reliability. Furthermore, additional replica stampers can be manufactured easily by repeating the above described process, thereby furthermore reducing the same overall manufacturing cost with an improved yield.

While the present invention has been described with respect to certain preferred embodiments only, other modifications and variations may be made without departing from the scope of the present invention as set forth in the following claims.

What is claimed is:

1. A method for manufacturing a replica stamper for use in the mass production of an optical disk, wherein the optical disk has a plurality of tracks arranged spirally or concentrically, and each of the tracks has a recess and a protrusion for the recordation of information signals thereon, the method comprising the steps of:

(a) preparing a master stamper made of polycarbonate having a top surface and a flat bottom surface, wherein the top surface of the master stamper includes a plurality of tracks, the plurality of tracks on the master stamper corresponding to the plurality of tracks on the optical disk, each of the tracks being provided with a recess and a protrusion;

(b) depositing a buffer layer on the entirety of the top surface of the master stamper;

(c) forming a replica stamper on top of the buffer layer;

(d) disengaging the master stamper from the buffer layer and the replica stamper; and (e) removing the buffer layer from top of the replica stamper.

2. The method of claim 1, wherein said step (a) of preparing the master stamper includes the steps of:

(a1) preparing a substrate having a flat top and a flat bottom surfaces;

(a2) forming a first separation layer on the top surface of the substrate;

(a3) patterning the first separation layer into a predetermined configuration, wherein the predetermined configuration includes the plurality of tracks of the master stamper corresponding to the plurality of tracks on the optical disk;

(a4) depositing a second separation layer having a uniform thickness on top of the patterned separation layer;

(a5) providing a metallic layer on top of the second separation layer;

(a6) separating the patterned separation layer and the substrate from the second separation layer and the metallic layer; and (a7) dissolving the second separation layer from the metallic layer to thereby form the master stamper.

3. The method of claim 1, wherein the buffer layer is made of silver.

4. The method of claim 1, wherein the buffer layer is made of gold.

5. The method of claim 1, wherein the buffer layer is formed by using a sputtering method.

6. The method of claim 1, wherein the replica stamper is formed by using a non-electrolytic plating method.

7. The method of claim 1, wherein the replica stamper is disengaged from the buffer layer and the replica stamper by employing a solution.

8. The method of claim 7, wherein the solution is prepared by dissolving hydrogen peroxide into ammonia water.

* * * * *